3,634,544
PROCESS FOR PREPARING FILMS OF POLY-γ-
  METHYL GLUTAMATE MODIFIED WITH
  POLYURETHANE RESIN
Yoshifumi Takeda, Tokyo, and Yasuo Takagi and Shigeo
  Mori, Kanagawa-ken, Japan, assignors to Ajinomoto
  Co., Inc., Tokyo, Japan
No Drawing. Filed Apr. 30, 1969, Ser. No. 820,652
  Claims priority, application Japan, May 1, 1968,
                     43/29,325
                Int. Cl. C08g 41/04
U.S. Cl. 260—858                                3 Claims

ABSTRACT OF THE DISCLOSURE

A solution of poly-γ-methyl glutamate modified with polyurethane resin in a mixture of a chlorinated aliphatic hydrocarbon solvent with a water soluble organic solvent free from active hydrogen and having a boiling point higher than that of the chlorinated hydrocarbon is cast to form a solvated film, the chlorinated hydrocarbon is evaporated, and the resulting gel is leached with water to remove the residual solvent, leaving behind a leather-like film of high water vapor permeability.

---

The present invention relates to a process for preparing films from poly-γ-methyl glutamate modified with polyurethane resin.

An object of the present invention is to provide soft films which are suitable for use as an artificial leather material.

The optically active poly-γ-methyl glutamate (hereinafter, referred to as PMG) has recently been recommended as an artificial leather material. Films made from PMG alone, however, are inflexible and lack softness owing to their high Young's modulus and low elongation. In practice therefore, such a film can be used only as the surface layer of artificial leather.

It has now been found that films made from PMG modified with polyurethane resin have markedly improved softness and feel much like natural leather. Moreover, wet formed films of polyurethane-modified PMG, produced by extruding a solution of the polyurethane-modified PMG in a water soluble organic solvent into a water coagulating bath, exhibit the following advantages: (1) greatly improved tensile strength, elongation and elastic recovery compared with PMG, (2) a value of Young's modulus which may be varied within a certain range, (3) an appearance and feel closely similar to natural leather, depending on the polyurethane resin used, and (4) ability of forming films of considerable thickness. Because of these advantages, polyurethane-modified PMG can be used as a base material and core layer of artificial leather.

Although this wet film-forming method has the advantage of using water as a coagulating agent, it is not suitable for industrial application because the solution of the polyurethane-modified PMG in a water soluble organic solvent gels at room temperature and therefore must be heated to 60° C. or higher for forming films.

The present invention provides an industrially feasible process for preparing films of polyurethane-modified PMG which overcomes the disadvantages of the abovementioned process.

It has been further found that a solution of polyurethane-modified PMG in mixtures of chlorinated aliphatic hydrocarbon with a water soluble organic solvent free from active hydrogen and having a higher boiling point is a homogeneous fluid even at room temperature and that films of the polyurethane-modified PMG may be conveniently prepared by casting said solution in a solvated film, removing the chlorinated aliphatic hydrocarbon by evaporation and thereafter removing the other solvent by immersing the resulting gel in a coagulating bath consisting mainly of water.

Examples of chlorinated aliphatic hydrocarbon which may be used in the present invention are dichlormethane, chloroform, 1,2-dichlorethane, 1,1,2-trichlorethane and tetrachlorethane.

Water soluble organic solvents which may be used together with the chlorinated aliphatic hydrocarbons are N,N-dialkyl substituted fatty acid amides such as N,N-dimethyl formamide, N,N-diethyl formamide, N,N-dimethylacetamide and N,N - dimethylpropionamide, N-alkylpyrrolidones such as N-methylpyrrolidone and N-ethylpyrrolidone, γ-butyrolactone, dimethyl sulfoxide, ethylene carbonate, dioxane, tetrahydrofuran, hexamethylphosphoramide, trimethyl phosphate and triethyl phosphate.

The ratio of chlorinated aliphatic hydrocarbon to water soluble organic solvent free from active hydrogen is usually 9:1 to 1:1 by weight, the amount of the latter solvent being as great as possible without forming a gel.

A solution of the polyurethane-modified PMG, commonly referred to as "dope" may be prepared, for example, by first dissolving PMG in a mixture of chlorinated aliphatic hydrocarbon and water soluble organic solvent free from active hydrogen, and thereafter adding a polyurethane resin having terminal isocyanate groups to the PMG solution, or by adding polyisocyanate to the PMG solution and subsequently either a polyester having terminal hydroxyl groups or a polyalkylene glycol ether.

The PMG solution may be prepared by polymerizing optically active γ-methyl glutamate-N-carboxy anhydride in a chlorinated aliphatic hydrocarbon solvent for PMG and then adding the water soluble organic solvent in such an amount as not to form a gel. The PMG solution may also be prepared by polymerizing optically active γ-methyl glutamate-N-carboxy anhydride in a mixture of chlorinated aliphatic hydrocarbon and water soluble organic solvents.

Table 1 shows the results obtained when γ-methyl-L-glutamate-N-carboxy anhydride was polymerized in water soluble organic solvents free from active hydrogen alone and in admixture with chlorinated aliphatic hydrocarbon.

Table 2 shows the viscosities of the PMG solution listed in Table 1 and of the polyurethane-modified PMG solutions and properties of films made from the respective solutions.

TABLE 1

| Run No. | Solvent employed | Conc. of NCA* (g./dl.) | Polymerization initiator | NCA/ initiator (molar ratio) | Polymerization temperature °C. | Degree of polymerization | Viscosity of PMG solution (poise) at— | | |
|---|---|---|---|---|---|---|---|---|---|
| | | | | | | | 20° C. | 40° C. | 120° C. |
| 1 | N,N-dimethyl formamide | 25 | Triethylenediamine | 500 | −10~80 | 2,800 | Gel | Gel | 250 |
| 2 | N,N-dimethylacetamide | 25 | ___do___ | 500 | −10~80 | 2,200 | Gel | Gel | 180 |
| 3 | N-methylpyrrolidone | 25 | ___do___ | 500 | −10~80 | 2,400 | Gel | Gel | 260 |
| 4 | γ-Butyrolactone | 25 | ___do___ | 500 | −10~80 | 1,800 | Gel | Gel | 150 |
| 5 | Dioxane | 13 | Triethylamine | 300 | 25 | 3,000 | Gel | Gel | 150 |
| 6 | Trimethyl phosphate | 25 | Triethylenediamine | 200 | 25 | 1,500 | Gel | Gel | 380 |
| 7 | {80 parts of 1,2-dichlorethane / 20 parts of N,N-dimethyl formamide} | 25 | Diethanolamine | 800 | 25 | 2,000 | 180 | 140 | 40 |
| 8 | {90 parts of 1,2-dichlorethane / 10 parts of N,N-dimethyl formamide} | 25 | Triethanolamine | 100 | 25 | 1,800 | 150 | 90 | 30 |
| 9 | {80 parts of 1,2-dichlorethane / 20 parts of γ-butyrolactone} | 25 | Triethylamine | 70 | 25 | 1,500 | 160 | 120 | 30 |
| 10 | {50 parts of methylene chloride / 50 parts of dioxane} | 13 | ___do___ | 100 | 25 | 3,500 | 480 | 390 | 100 |
| 11 | {90 parts of chloroform / 10 parts of trimethyl phosphate} | 25 | ___do___ | 100 | 25 | 1,200 | 350 | 300 | 80 |
| 12 | {80 parts of 1,2-dichlorethane / 20 parts of hexamethyl phosphoramide} | 25 | ___do___ | 100 | 25 | 1,600 | 150 | 100 | 25 |

* NCA: γ-Methyl-L-glutamate-N-carboxy anhydride.

TABLE 2

| Run No. | PMG solution (Run No. shown in Table 1) | PMG/ polyurethane resin (by weight) | Viscosity of solution (poise) at— | | Physical properties of film | | | | | | |
|---|---|---|---|---|---|---|---|---|---|---|---|
| | | | 20° C. | 80° C. | Thickness (mm.) | Tensile strength (kg./mm.²) | Elongation (percent) | Young's modulus (kg./mm.²) | Elastic recovery (3% extended) (percent) | Water vapour permeability (kg./m.²/24 h.) | Feeling |
| 13 | 2 | 1/0 | Gel | 180 | 0.25 | 2.8 | 70 | 110 | 32 | 1,380 | Hard and inflexible. |
| 14 | 8 | 1/0 | 150 | 30 | 0.28 | 2.4 | 55 | 93 | 40 | 1,410 | Do. |
| 15 | 2 | 1/1 | Gel | 210 | 0.31 | 4.2 | 175 | 48 | 62 | 1,200 | Soft. |
| 16 | 8 | 1/1 | 170 | 38 | 0.29 | 3.5 | 151 | 36 | 55 | 1,350 | Do. |
| 17 | 10 | 1/1 | 520 | 110 | 0.33 | 4.4 | 225 | 43 | 45 | 1,280 | Do. |
| 18 | 11 | 1/1 | 410 | 85 | 0.35 | 3.8 | 143 | 35 | 61 | 1,100 | Do. |

NOTE.—Polyurethane resin prepared according to the procedure of Example 1 was employed.

TABLE 2'

| Run No. | Film-forming procedure | |
|---|---|---|
| 13 | Immersed in water of 40° C | Control. |
| 14 | ___do___ | |
| 15 | ___do___ | |
| 16 | Air-dried at 65° C. and immersed in water of 40° C | The present process. |
| 17 | Air-dried at 35° C. and immersed in water of 40° C | |
| 18 | Air-dried at 55° C. and immersed in water of 40° C | |

In the "polyurethane-modified PMG," as the term is used in the present application the active hydrogen atom attached to the nitrogen atom in the main chain of PMG and an active isocyanate group of the polyurethane resin are chemically bonded. It may be prepared, for example according to the following methods:

(1) a polyester having terminal hydroxy groups and a diisocyanate are reacted to produce a polyester having a terminal isocyanate group which is then reacted with PMG.
(2) a polyalkylene glycol ether and a diisocyanate are reacted to produce a polyether having a terminal isocyanate group which is then reacted with PMG.
(3) a polyester and polyether having a terminal isocyanate group may be further lengthened by the reaction terminal groups with compounds containing at least two active hydrogens such as water, polyhydric alcohols and polyamines to form chain-extended polymers having terminal isocyanate groups which are then reacted with PMG.
(4) a polyester having a terminal hydroxyl group or a polyalkylene glycol ether and a diisocyanate are reacted to form a polyurethane having a terminal hydroxyl group, and then said polyurethane is reacted with a diisocyanate to yield a product having a terminal isocyanate group which is reacted with PMG.
(5) PMG is first reacted with a polyisocyanate and then reacted with a polyester having a terminal hydroxyl group or a polyalkylene glycol ether.
(6) PMG is first reacted with a polyisocyanate and then with a polyurethane having a terminal hydroxyl group which may be derived from the reaction of a polyester having a terminal hydroxyl group or of a polyethylene glycol ether with a diisocyanate.

The polyurethane resin having a terminal isocyanate group may be having terminal isocyanate group derived from the reaction of a polyalkylene glycol ether having an average molecular weight of 500 to 10,000 with a diisocyanate or from the reaction of a polyester having a terminal hydroxyl group and an average molecular weight of 500 to 10,000 with a diisocyanate or may be a chain-extended polymer having a terminal isocyanate group derived from the reaction between a polyurethane resin having a terminal isocyanate group as described above and compounds such as water, polyhydric alcohols, e.g., ethylene glycol or glycerin and polyamines, e.g., ethylene diamine or hydrazine. In addition, the polyurethane resin having a terminal isocyanate group may be derived from the reaction between a polyurethane resin having terminal hydroxyl groups and a diisocyanate, or a corresponding chain-extended polymer obtained by reaction with a compound bearing active hydrogen.

The reaction of these polyurethane resins with PMG may be carried out even at room temperature. However, the reaction proceeds more rapidly with heating.

Polyalkylene glycol ethers used in the preparation of a polyurethane resin having a terminal isocyanate group include polyethylene glycol ether, polypropylene glycol ether, polytetramethylene glycol ether or their mixtures and poly glycol ethers containing different alkylene radicals in the molecule as shown.

A polyester having a terminal hydroxyl group may be prepared by condensation of a dibasic carboxylic acid such as succinic acid, adipic acid, pimelic acid, sebacic acid, malic acid, fumaric acid, phthalic acid, dimer acid or their mixtures with an excess of a polyhydric alcohol such as ethylene glycol, propylene glycol, butylene glycol, glycerin-2-monomethyl ether, trimethylolpropane or their mixtures.

The diisocyanate to be reacted with a polyalkylene glycol ether or a polyester having a terminal hydroxyl group may be aliphatic, aromatic or alicyclic. Examples of aliphatic diisocyanates include ω,ω'-diisocyanate ethane, diisocyanate propane, ω,ω'-diisocyanate butane, ω,ω'-diisocyanate pentane, 1,2-diisocyanate propane and 1,2-, 2,3- or 1,3-diisocyanate butane. Examples of aromatic diisocyanates include 1,3- or 1,4-diisocyanate benzene,
1-methyl-2,4-, -2,6- or -2,5-diisocyanate benzene,
1,3-dimethyl-2,4- or -4,6-diisocyanate benzene,
1,4-dimethyl-2,5-diisocyanate benzene,
1-ethyl-2,4-diisocyanate benzene, 1,4-, 1,5-, 2,6- or 2,7-diisocyanate naphthalene,
2,2'-diisocyanate-1,1'-binaphthalene, 2,4'-diisocyanate biphenyl,
4,4'-diisocyanate biphenyl,
3,3'-dimethyl-4,4'-diisocyanate biphenyl,
3,3'-dimethoxy-4,4'-diisocyanate biphenyl,
2-nitro-4,4'-diisocyanate biphenyl,
di(4-isocyanate)phenylmethane,
di(2,5-dimethyl-4-isocyanate) phenylamethane,
di(3-methoxy-4-isocyanate)phenylmethane,
di(4-methoxy-3-isocyanate)phenylmethane,
di(2-methyl-5-methoxy-4-isocyanate)phenylmethane,
2,2'-dimethyl-4,4'-diisocyanate-diphenylmethane,
2-(2,4-diisocyanatephenyl)phenylethane,
3-nitro-4,4'-diisocyanate triphenylmethane,
4-nitro-triphenylmethan-4,4'-diisocyanate.

Examples of alicyclic diisocyanate include

ω,ω'-diisocyanate-1,2-dimethylcyclohexane,
ω,ω'diisocyanate-1,4-dimethylcyclohexane,
ω,ω'-diisocyanate-1,2- or -1,3-dimethylbenzene,
ω,ω'-diisocyanate-1,4-diethyl benzene,
ω,ω'-diisocyanate-1,4-dimethyl naphthalene,
1-ω-methyl-isocyanate-2-ω-propylisocyanate-3,5-dimethylcyclohexane,
3,9-bis(3-isocyanatepropyl)-2,4,8,10-teroxaspiro-[5,5]undecane,
3,9-bis{3-(2-chlor-6-isocyanate phenyl)-propyl}-2,4,8,10-tetroxaspiro[5,5]undecane,
3,9-bis{3-(2-chlor-5-isocyanate phenyl)propyl}-2,4,8,10-tetroxaspiro-[5,5]undecane,
3,9-bis{3-(5-isocyanate phenyl)propyl}-2,4,8,10-teroxaspiro[5,5]undecane,
3,9-bis(4-isocyanate butyl)-2,4,8,10-teroxaspiro [5,5]undecane,
3,9-bis(6-isocyanate hexyl)-2,4,8,10-tetroxaspiro [5,5]undecane,
3,9-bis(3,4-dimethyl-6-isocyanate hexyl)-2,4,8,10-teroxaspiro[5,5]undecane,
3,9-bis(3,4-dimethyl-7-isocyanate hepty)-2,4,8,10-teroxaspiro[5,5]undecane.

For the preparation of a polyurethane resin having a terminal isocyanate group, a diisocyanate and polyalkylene glycol ether or polyester having a terminal hydroxyl group are reacted in such a ratio that the —NCO equivalents in the diisocyanate are more than the —OH equivalents in the polyalkylene glycol ether or polyester.

According to the present invention, the polyurethane-modified PMG may be prepared by adding a polyurethane resin having a terminal isocyanate group to the PMG solution or by first adding a polyisocyanate such as a diisocyanate or triisocyanate to the PMG solution whereby the active hdrogen attached to the nitrogen atom in the main chain of the PMG is bonded to an isocyanate group in the polyisocyanate, and then adding a polyester having a terminal hydroxyl group or a polyalkylene glycol ether. In the latter case, an additional amount of polyisocyanate may be added. In the reaction product, repeating units of PMG radicals are bound to repeating units of polyurethane radicals.

The ratio of PMG to polyurethane resin can be widely varied depending on the product desired. When the amount of polyurethane resin exceeds that of PMG, the elasticity of the product becomes greater but the feel becomes rubber-like and different from that of natutral leather.

The polyurethane-modified PMG may be further chain-extended or cross-linked by water, a polyhydric alcohol such as ethylene glycol or glycerine, a polyamine such as ethylene diamine or hydrazine, a polyisocyanate such as tolylene diisocyanate or dinaphthalene methane diisocyanate. This cross-linking may be carried out in solution or while the film formed remains still in the gel stage.

In order to form films from a solution of polyurethane-modified PMG, a suitable substrate is coated by spreading the solution with a doctor blade coater or roller coater, by spraying the solution on the substrate or by immersing the substrate in the solution. Thereafter, the chlorinated aliphatic hydrocarbon is allowed to evaporate between room temperature and the boiling point of the chlorinated aliphatic hydrocarbon employed, and the film is coagulated and regenerated by immersion in a water bath or in a coagulating bath containing mainly water, to remove the water soluble organic solvent. The films formed may be further washed with water, and dried, if necessary.

A certain amount of water soluble organic solvent without active hydrogen may be originally present in the coagulating bath. The temperature of the coagulating bath determines the regeneration velocity of the film and is usually 10° C. to 80° C.

As substrate, there may be employed glass, metal, paper, woven or non-woven textiles, synthetic resin, sheets of nylon, polyurethane or polyvinyl chloride and artificial or natural leather.

The concentration of the polyurethane-modified PMG solution may be between 5% and 40% by weight depending upon the properties of the polyurethane-modified PMG itself, the desired film thickness, the kind of substrate, and is preferably 10% to 30% based on the total weight of the solution. The solution is usually transparent, but even a white turbid solution may be employed so long as it is fluid and flowable.

If necessary, other compounds of high molecular weight such as natural or artificial rubber, acrylic and vinyl resins, and plasticizers such as dioctyl phthalate, chlorinated polyphenyl and chlorinated paraffin may be combined with the solution of the polyurethane-modified PMG in compatible amounts. In addition, pigments such as carbon black or titanium oxide may be compounded therewith to produce coloured films.

The following examples, in which parts are by weight unless stated otherwise illustrate the present invention:

EXAMPLE 1

A mixture composed of 150 parts adipic acid, 60 parts ethylene glycol and 35 parts propylene glycol was maintained for twenty hours at 150° C. under an atmosphere of nitrogen. The reaction mixture was then heated to 200° C. for five hours under reduced pressure. Upon cooling, a soft, waxy polyester having a hydroxyl value of 62 and an acid value of 0.6 was obtained.

To 18 parts of the polyester so prepared 4 parts of naphthalene, 1,5-diisocyanate were added and the mixture was heated to 100° C. under an atmosphere of nitrogen for four hours with agitation. After cooling to 40° C., the reaction mixture was dissolved in 50 parts of N, N-dimethyl formamide, and the solution was further mixed with 10 parts of N,N-dimethyl formamide containing 0.1 part of water to produce a viscous solution of polyurethane resin.

Simultaneously 25 g. of γ-methyl-L-glutamate-N-carboxy anhydride was suspended in 100 ml. of a mixture of 80 parts of 1,2-dichlorethane and 20 parts of N,N-dimethyl formamide and polymerized at 25° C. for ten hours with stirring by the addition of 0.021 g. of diethanolamine to form a solution of PMG (degree of polymerization: 2000).

The PMG solution so obtained was heated to 60° C. and mixed with 36 g. of the solution of the polyurethane resin. The mixed solution was maintained at that temperature for two hours and then cooled to 25° C. The proportion of polyurethane resin to PMG was 50% by weight. The viscosity of this solution was 350 poise.

The solution of the polyurethane-modified PMG thus prepared was spread in a uniform film of 2 mm. thickness on a glass plate with the aid of an applicator. 1,2-dichlorethane was allowed to evaporate at 60° C. for 30 minutes.

solution was cooled to 25° C. Its viscosity was 280 poise. The proportion of polyurethane resin to PMG was 50% by weight.

The solution of the polyurethane-modified PMG was spread in a film of 2 mm. thickness on a glass plate with the aid of an applicator and methylene chloride was allowed to evaporate at 60° C. for 30 minutes. The glass plate and the film thereupon cast were immersed for 30 minutes in a coagulating bath of 95% by volume of water and 5% by volume of $\gamma$-butyrolactone at 40° C. The coagulated film was washed in running water for 30 minutes and dried at 60° C. for 2 hours. The physical properties of the film removed from the casting surface are shown in Table 4 which also summarizes the results ob-

TABLE 3

| Run No. | Amount of polyurethane resin added (g.) | PMG/poly-urethane resin (ratio by weight) | Physical properties of film | | | | | | |
|---|---|---|---|---|---|---|---|---|---|
| | | | Thickness (mm.) | Tensile strength (kg./mm.$^2$) | Elongation percent | Young's modulus (kg./mm.$^2$) | Elastic recovery (3% extended) (percent) | Water vapour permeability (g./m.$^2$/24 h.) | |
| 1 | 18 | 1/0.25 | 0.33 | 2.7 | 125 | 70 | 64 | 1,210 | Soft and similar feel to natural leather. |
| 2 | 36 | 1/0.5 | 0.30 | 5.7 | 158 | 67 | 61 | 1,360 | |
| 3 | 72 | 1/1 | 0.38 | 4.5 | 146 | 59 | 65 | 1,200 | |
| 4 | 108 | 1/1.5 | 0.41 | 3.3 | 220 | 41 | 74 | 1,250 | |
| 5 | 144 | 1/2 | 0.40 | 3.0 | 251 | 35 | 75 | 1,100 | |
| 6 | 0 | 1/0 | 0.26 | 2.5 | 70 | 102 | 45 | 1,490 | Hard. |

The film was coagulated by immersing the plate for 30 minutes in a coagulating bath of 90% by volume of water and 10% by volume of N,N-dimethyl formamide at 30° C., washed in running water for 30 minutes and then dried for 2 hours at 60° C.

The physical properties of the block copolymer film removed from the casting surface are shown in Table 3 which also summarizes the results obtained by similar procedures varying only the proportion of polyurethane resin to PMG.

tained by varying only the proportion of polyurethane resin to PMG.

TABLE 4

| Run No. | Amount of polyurethane resin (g.) | PMG/poly-urethane resin (ratio by weight) | Physical properties of film | | | | | | |
|---|---|---|---|---|---|---|---|---|---|
| | | | Thickness (mm.) | Tensile strength (kg./mm.$^2$) | Elongation (percent) | Young's modulus (kg./mm.$^2$) | Elastic recovery (3% extended) (percent) | Water vapour permeability (g./m.$^2$/24 hrs.) | |
| 7 | 36 | 1/0.5 | 0.32 | 3.8 | 176 | 55 | 60 | 1,100 | Soft and similar feel to natural leather. |
| 8 | 72 | 1/1 | 0.30 | 4.6 | 210 | 38 | 75 | 1,240 | |
| 9 | 144 | 1/2 | 0.35 | 3.5 | 280 | 21 | 78 | 1,020 | |

EXAMPLE 2

To 100 parts of polypropylene glycol having an average molecular weight of 2,000 and a hydroxyl value of 56 was added 26 parts of methylene bis(4-phenylisocyanate) in an atmosphere of nitrogen. The temperature was maintained at 120° C. for 120 minutes after which the mixture was cooled to 40° C. and 250 parts of $\gamma$-butyrolactone were added to form a homogeneous solution. To the resultant solution was added 100 parts of $\gamma$-butyrolactone containing 1.5 parts of ethylene diamine and the mixture was stirred for 2 hours at room temperature to prepare a solution of polyurethane resin.

Simultaneously, 25 g. of $\gamma$-methyl-L-glutamate-N-carboxy anhydride were suspended in 100 ml. of a mixture of 80 parts of methylene chloride and 20 parts of $\gamma$-butyrolactone and polymerized at 25° C. for 6 hours by the addition of 0.26 g. triethylamine to form a solution of PMG (degree of polymerization: 2,000). The PMG solution was heated to 60° C. and 36 g. of the solution of polyurethane resin prepared previously was added thereto. After standing for 2 hours at 60° C., the mixed

EXAMPLE 3

25 g. of $\gamma$-methyl-L-glutamate-N-carboxy anhydride were suspended in 100 ml. of a mixture of 80 parts of chloroform and 20 parts of N-methyl pyrrolidone and polymerized at 25° C. for 5 hours by the addition of 0.22 g. of triethylamine under stirring (degree of polymerization: 1,800). The PMG solution obtained was heated to 40° C. and there was added 10 g. of a 75% ethyl acetate solution of a polyurethane resin "Coronate L" (tradename, product of Japan Polyurethane Industry Co., Inc., a reaction product of 3 moles of tolylene diisocyanate and 1 mole of trimethylol-propane). After stirring for 30 minutes at 40° C., there was further added 25 g. of "Desmophen 1700" (trade name, product of Farbenfabriken Bayer A.G. a polyester of adipic acid and a diol having a hydroxyl value of 40, an acid value below 2, a specific gravity of 1.19 and a viscosity of 500 centipoise at 75° C.). The temperature was maintained at 40° C. for 2 hours after which the mixed solution was cooled to 25° C. Its viscosity was 400 poise.

The solution of polyurethane-modified PMG thus prepared was spread in a film of uniform 1 mm. thickness on a glass plate with the aid of an applicator and chloroform was allowed to evaporate at 50° C. for 30 minutes. The glass plate and the film thereupon cast were immersed for one hour in water at 25° C. and air-dried overnight. Upon removal from the casting surface, the film had a thickness of 0.25 mm., tensile strength of 6.5 kg./mm.$^2$, elongation of 243%, Young's modulus of 32 kg./mm.$^2$ and water vapour permeability of 1000 g./m.$^2$/24 hrs. The film was soft and not tacky. It had a feel similar to natural leather.

EXAMPLE 4

25 g. of γ-methyl-L-glutamate-N-carboxy anhydride were suspended in 100 ml. of 1,2 - dichlorethane and polymerized at 25° C. for 3 hours by the addition of 0.13 g. of triethylene-diamine under stirring to form a solution. The degree of polymerization of PMG was 1,800.

To the PMG solution obtained there were added 72 g. of a solution of polyurethane resin in N,N-dimethyl formamide which was prepared according to the procedure of Example 1. The mixed solution was maintained at 60° C. for 2 hours under stirring and then cooled to 25° C. The proportion of polyurethane resin to PMG was 1:1 (by weight). The viscosity was 420 poise at 25° C.

The solution of the polyurethane-modified PMG was spread in a film of uniform 2 mm. thickness on a glass plate with the aid of an applicator and 1,2 - dichlorethane was allowed to evaporate at 65° C. for 30 minutes. The glass plate and the film thereupon cast were immersed for 30 minutes in 90% by volume of water and 10% by volume of N,N-dimethyl formamide at 30° C. The coagulated film was washed in running water for 30 minutes and dried at 60° C. for 2 hours. The thickness of the film was 0.38 mm. The physical properties of the film were as follows:

Tensile strength—4.8 kg./mm.$^2$
Elongation—320%
Young's modulus—24 kg./mm.$^2$
Water vapour permeability—1200 g./m.$^2$/24 hrs.

The film was soft and had a feel closely similar to natural leather.

EXAMPLE 5

2.5 kg. of γ-methyl-L-glutamate-N-carboxy anhydride were suspended in 10 l. of 1,2-dichlorethane and polymerized at 20° C. for 3 hours by the addition of 13 g. of triethylene-diamine under stirring to form a solution of PMG. The degree of the polymerization of PMG was 2,100.

To the solution of PMG was added a solution of 1.5 kg. of "Coronate 4048" (trade name, product of Japan Polyurethane Industry Co., Inc., a polyester related polyurethane resin having terminal isocyanate groups) and 300 g. of carbon black dispersed in 3 l. of γ-butyrolactone. The mixture was maintained at 60° C. for 2 hours and then cooled to 25° C. The proportion of polyurethane resin to PMG was 1.25:1 by weight. The viscosity of the solution of the polyurethane-modified PMG was 300 poise at 25° C.

A non-woven fabric of heat-shrunk polyethylene terephthalate fibers of about 0.5 denier was continuously passed through the solution of polyurethane-modified PMG and squeezed with a squeeze roller. The amount of the solution picked up by the fabric was 60% by weight. Subsequently the impregnated fabric was passed through a hot-air drier of 60° C. to evaporate the 1,2-dichlorethane, and to convert the solution to a gel unwoven texture containing film of gel state.

The solution of the polyurethane-modified PMG was spread in a film of 2 mm. thickness on the fabric impregnated with the gel and the coated fabric was again passed through a hot-air drier of 60° C. to evaporate 1,2-dichlorethane. Thereafter, the fabric was passed through a mixture of 5% by volume of γ-butyrolactone and 95% by volume of water at 30° C., the dwell time in the coagulating bath being 30 minutes.

After washing in running water, the coated, impregnated fabric was dried at 60° C. and embossed with a leather-like pattern by passing it between two engraved rollers heated to 180° C.

The thickness of the artificial leather was 1.85 mm. Its physical properties were as follows:

Tensile strength—3.3 kg./mm.$^2$
Elongation—48%
Tearing strength—3.8 kg./mm.$^2$
Water vapour permeability—1540 g./m.$^2$/24 hrs.

The appearance and feel of the material were closely similar to those of natural leather.

What we claim is:

1. A block copolmer essentially consisting of repeating units of poly-γ-methyl glutamate radicals and repeating units of polyurethane radicals, said polyurethane radicals and said poly-γ-methyl glutamate radicals being bound to each other, said polyurethane radicals being the radicals of isocyanate terminated polyurethane prepolymers prepared by the reaction of a polyisocyanate and a member selected from the group consisting of hydroxy terminated polyesters and hydroxy terminated polyethers, each having a molecular weight of from about 500 to about 10,000, the ratio of said polyurethane radicals to said poly-γ-methyl glutamate radicals being sufficient to significantly improve the softness of a film prepared from said block copolymer as compared to a film of poly-γ-methyl glutamate, when said films are prepared by casting respective solutions of said block copolymer and of said poly-γ-methyl glutamate in a mixture of a chlorinated aliphatic hydrocarbon solvent with a water soluble organic solvent free from active hydrogen on respective glass substrates, evaporating the chlorinated hydrocarbon from said substrates, leaching the resulting gels with water to remove the residual solvent, and drying the films so coagulated.

2. A block copolymer as set forth in claim 1, wherein the ratio of said polyurethane radicals to said poly-γ-methyl glutamate radicals is not greater than 2:1 by weight.

3. A block copolymer as set forth in claim 2, wherein said ratio is at least 0.25:1 by weight.

References Cited

UNITED STATES PATENTS

| | | | |
|---|---|---|---|
| 2,946,771 | 7/1960 | Ballard | 260—77.5 |
| 3,371,069 | 2/1968 | Miyamae | 260—78 |

FOREIGN PATENTS

| | | | |
|---|---|---|---|
| 42/11,672 | 6/1967 | Japan | 260—78 |
| 42/27,069 | 12/1967 | Japan | 260—78 |
| 43/11,479 | 5/1968 | Japan | 260—78 |

PAUL LIEBERMAN, Primary Examiner

U.S. Cl. X.R.

260—30.6, 30.8 DS, 31.8 M, 31.8 N, 32.6 N, 33.2 R, 33.8 UB, 75 NH, 75 NM, 77.5 AM, 77.5 AQ, 77.5 CA, 78 R; 264—178